Figure 1:
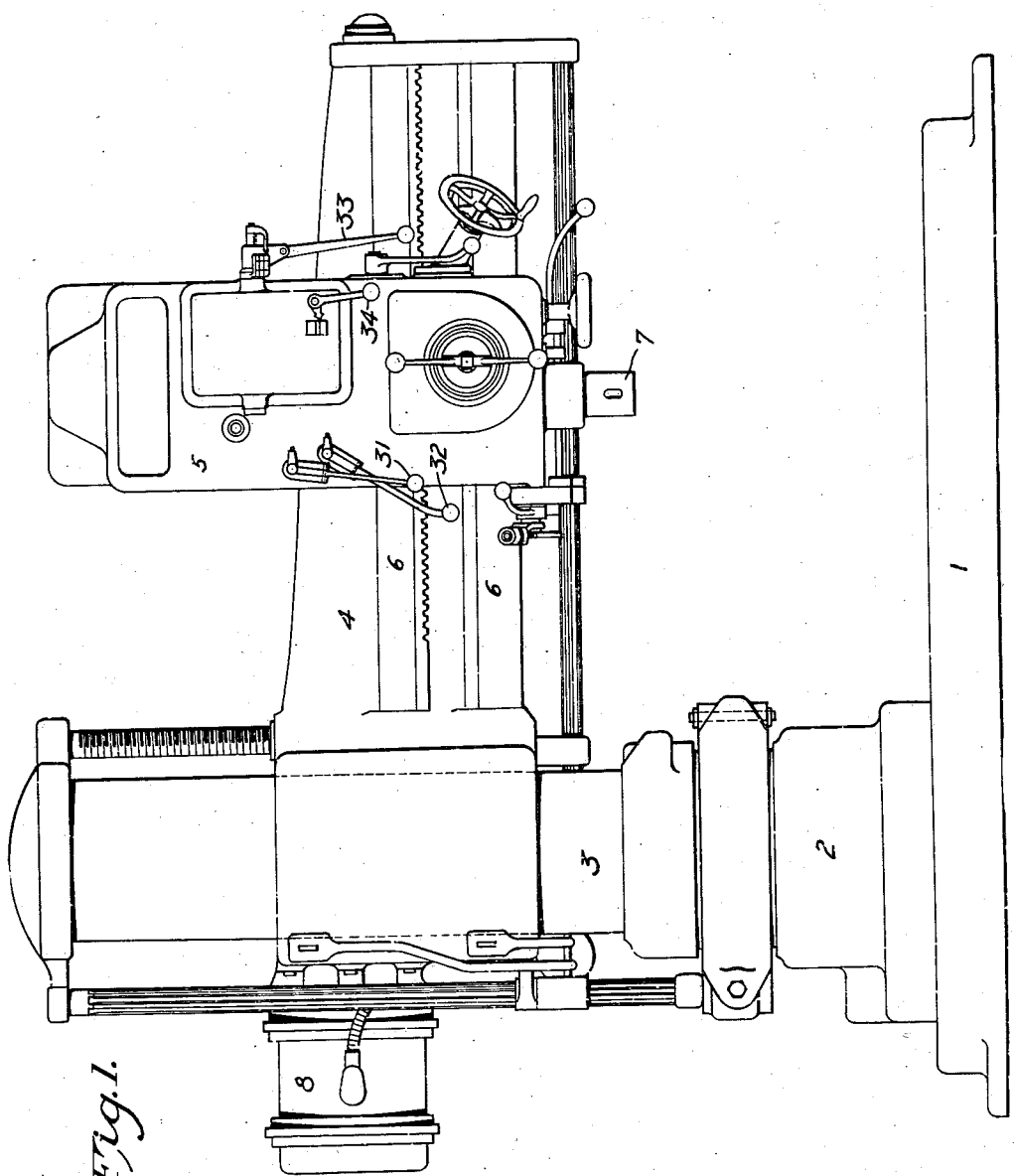

Oct. 16, 1934.  D. C. KLAUSMEYER  1,976,944
FEED GEAR ANTIOVERLOAD DEVICE
Filed Jan. 20, 1931   4 Sheets-Sheet 1

Inventor
DAVID C. KLAUSMEYER
DECEASED
BY H.HENRY SUNDERMANN
EXECUTOR
By Attorneys
Nathan & Bowman Oct. 16, 1934.  D. C. KLAUSMEYER  1,976,944
FEED GEAR ANTIOVERLOAD DEVICE
Filed Jan. 20, 1931  4 Sheets-Sheet 2
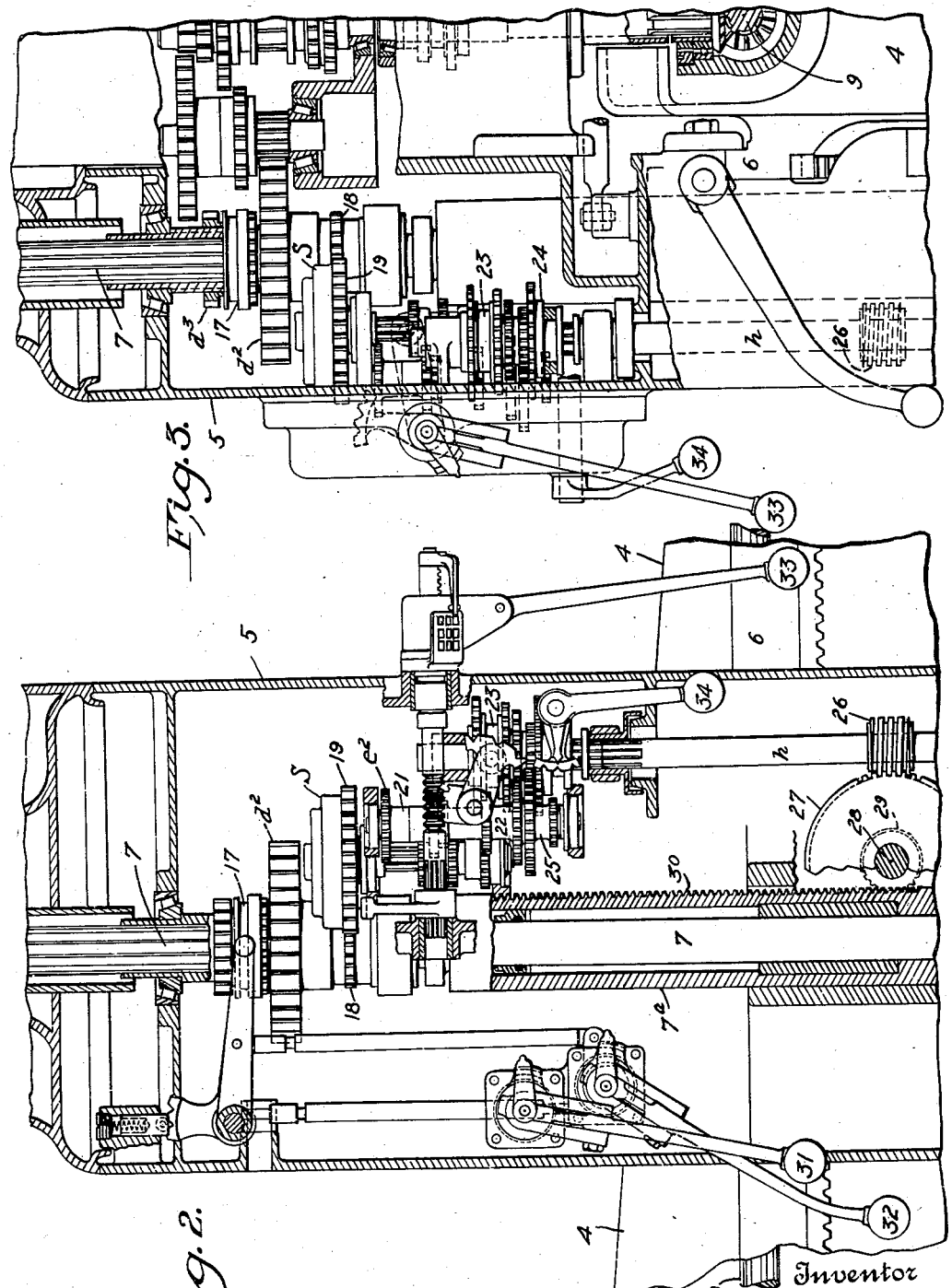
Inventor
DAVID C. KLAUSMEYER
DECEASED
By H. HENRY SUNDERMANN
EXECUTOR
By Attorneys
Nathan & Bowman

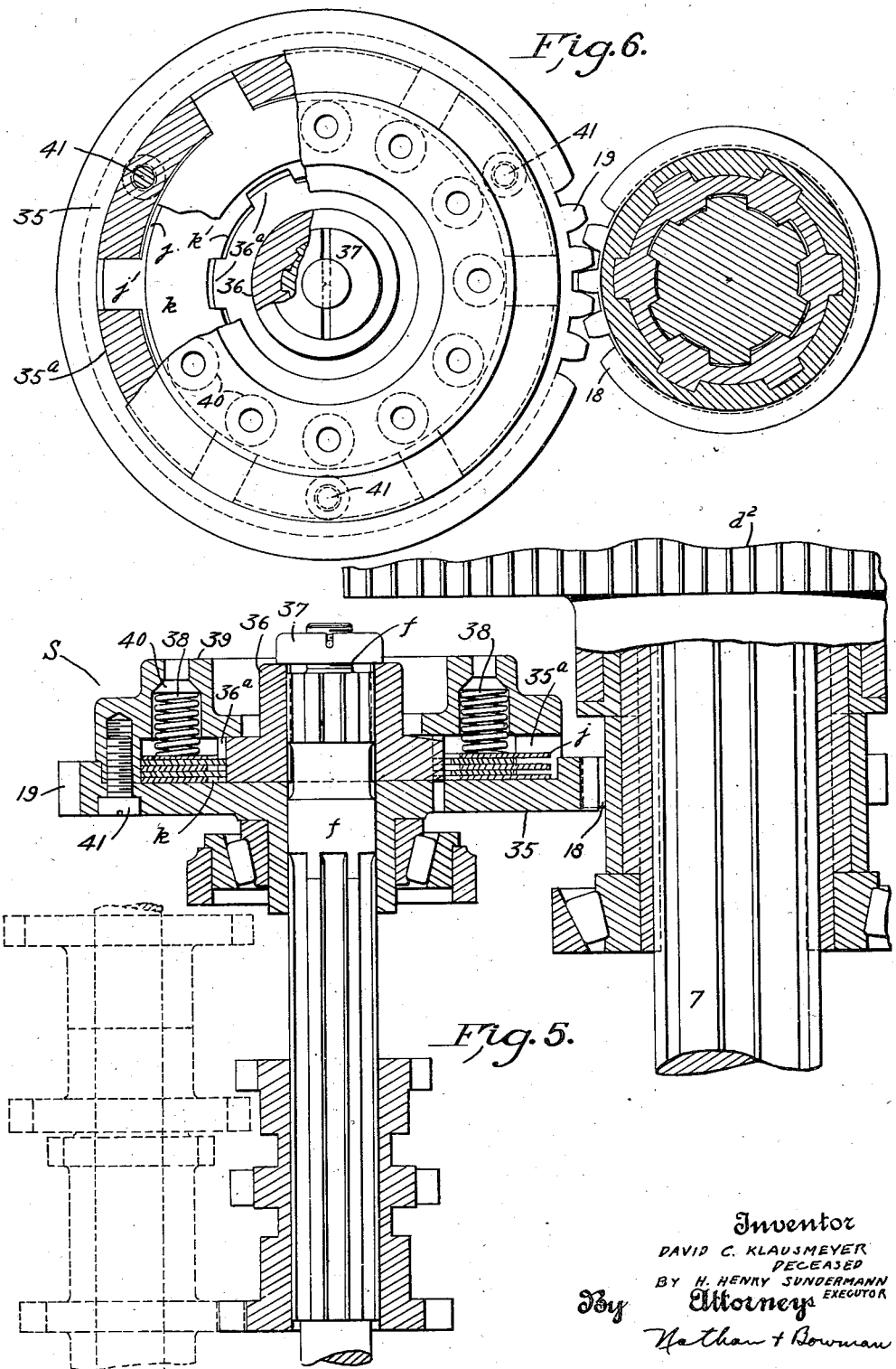

Patented Oct. 16, 1934

1,976,944

UNITED STATES PATENT OFFICE 1,976,944

FEED GEAR ANTIOVERLOAD DEVICE

David C. Klausmeyer, deceased, late of Cincinnati, Ohio, by H. Henry Sundermann, executor, Cincinnati, Ohio, assignor to The Cincinnati Bickford Tool Company, Cincinnati, Ohio, a corporation of Ohio Application January 20, 1931, Serial No. 510,052

3 Claims. (Cl. 77—32)

This invention has to do with safety devices for machine tools and is particularly concerned with devices designed to prevent fracturing of the machine elements in the event that the tooling forces tend to exceed the capacity of a given machine.

It has for its main object to provide a device for suspending the operation of one or more of the power transmission mechanisms of a machine tool whenever the force required to overcome the work resistance exceeds a predetermined maximum.

A further object of this invention is to provide a safety device for a machine tool that will effectively transmit motion from one shaft to another and which will automatically suspend the drive whenever the power requirements are exceeded, and resume the drive when the value of the load upon the driven element is again reduced to a normal value.

Still another object is to provide a safety device for the feed works of a drilling machine which will automatically suspend the feed of a drill spindle whenever there is an overloading of the parts, and to so construct the device that it will be impossible under normal conditions of operation to vary the effectiveness thereof but nevertheless be capable of readjustment upon dismantling of the unit. In this way the unit may be adjusted to carry greater or lesser loads as desired and the unit again sealed in an effective manner to prevent tampering therewith by an unskilled or unauthorized operator. As an additional refinement it is proposed to construct a device of strong rugged character and one that will operate and transmit the required power over long periods of usage without interruption or attention thereto.

Such a device, it will be observed is in many respects superior to the shear-pin safety devices, and is peculiarly adapted for machine tools in which there are one or more transmissions for driving the tool or work-piece and one or more transmissions for feeding the tool relative to the work. In these types of machines, were both drives positive under all conditions, as is customarily the case, damaged tools or work-pieces are of frequent occurrence, and this is due, primarily, to the overloading of the parts, as by an unforeseen increase in the work resistance, or by the carelessness of the operator in applying a driving force beyond the capacity of the machine, tool, or work-piece.

This invention proposes to overcome the inherent disadvantages of the prior transmissions and to eliminate all possibility of the fracturing of the machine elements or work-pieces, by constructing a safety mechanism for the transmission, which will automatically suspend the drive when the load exceeds a predetermined value, and which will automatically take hold or resume the drive when the load is removed or decreased as the case may be.

In carrying out the objects of this invention it is proposed to arrange in the driving transmission a multi-disc power transmitting device having one set of discs engaged by the driving element and one set of discs, intervening those of the first set, engaged by the driven element and with resilient means of a strength sufficient to maintain driving relation between the discs under normal loads. The parts are so arranged that the two sets of discs will move relative to each other and suspend the drive in the event that the tooling forces create stresses in the mechanism in excess of their normal capacity. In this way there is provided a safety device for a driving mechanism which is entirely automatic in its operation and one that will function indefinitely without attention.

Unwarranted tampering of the mechanism by an unskilled operator has been anticipated in this arrangement by enclosing the device in a suitable housing which is adapted to be initially sealed before the unit is placed in operation. The machine is thereby protected against an operator's tendency to vary the tension in the unit and thus vary its driving power and defeat the purpose for which it is installed in the machine.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:—

Figure 4:
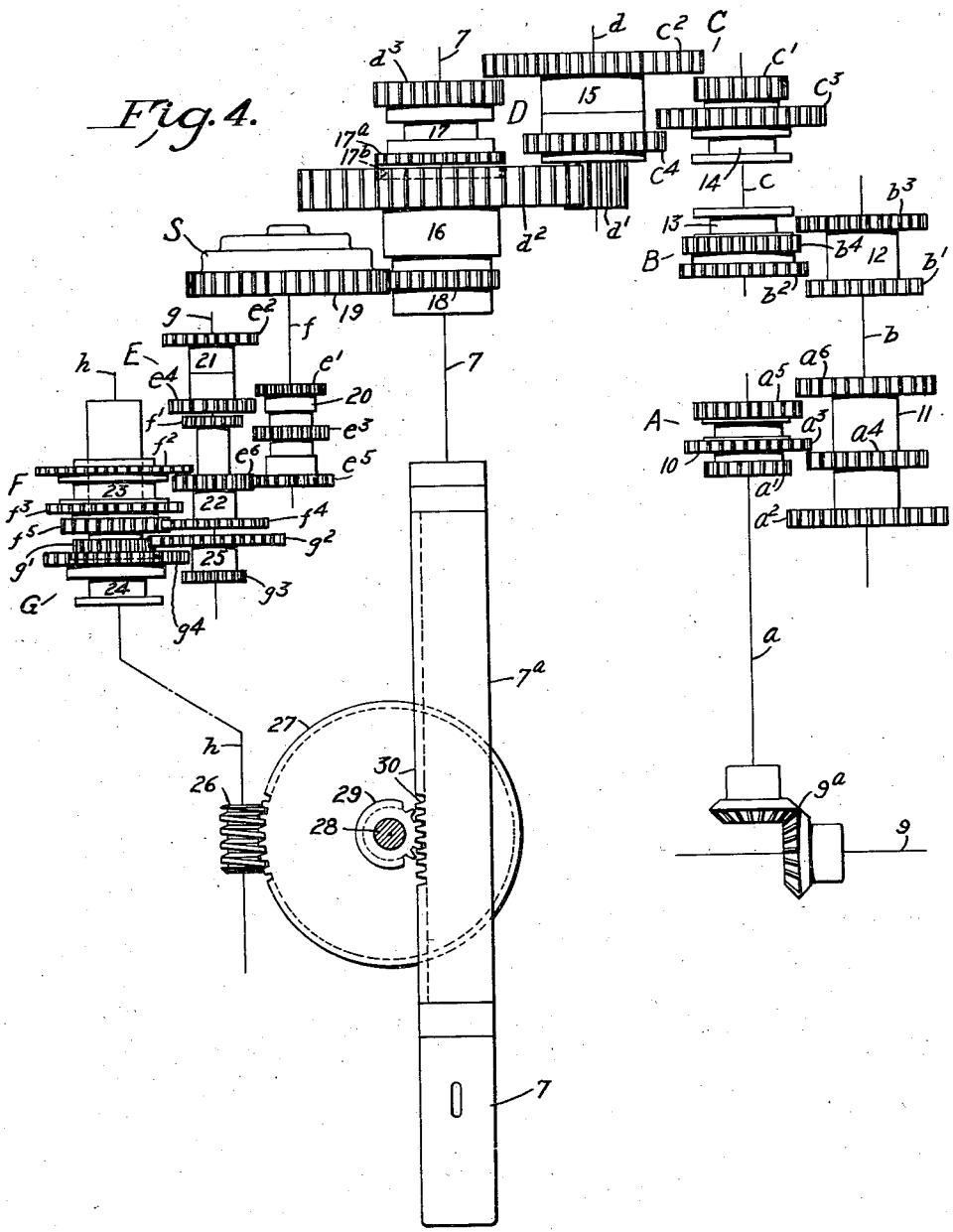

Figure 1 is an assembly view of a representative type of machine tool incorporating this invention. Figs. 2 and 3 are front and side sectional views respectively, of the head of the machine tool depicted by Fig. 1, and illustrating portions of the spindle speed and feed trains. Fig. 4 is a diagrammatic view of the spindle driving train and incorporating the anti-overload device in the spindle feed train. Fig. 5 is an enlarged sectional view of the overload device and its relation with a driving and a driven element. Fig. 6 is a plan view thereof, partly broken away better to illustrate the relative positions of the discs and their locking means.

A preferred embodiment of this invention is to the spindle drive and feed gearing of a machine tool, such as for example, of the radial drill type shown in Fig. 1. Machines of this character are ordinarily provided with a base and work support 1 upon which is mounted an upright post or column 2. A rotatable sleeve member 3 encircles the post and has translatably mounted thereon the radial arm 4 that carries the drill head 5. Movement of the head along the arm ways 6, the clamping of the arm to the sleeve, and the clamping of the sleeve to the post, are effected in a conventional manner and detailed descriptions thereof are thought to be unnecessary.

The head 5 has a spindle 7 rotatably and translatably mounted therein and which receives motive power in reverse directions from a prime mover 8, mounted upon the arm, through an arm shaft 9 and a variable speed transmission system carried by the head.

Figs. 2 and 3 illustrate portions of the gearing contained in the drill head 5 and Fig. 4 illustrates diagrammatically, the entire train from the arm shaft 9 to the spindle 7. Power from the prime mover 8 enters the head at the rear thereof, through the bevel gears $9^a$ and shaft $a$ to the change speed mechanism indicated generally as A. A gear unit 10 is slidably mounted upon the shaft $a$ and is adapted upon the movement of the control lever 31 to be positioned so that gears $a^1$, $a^3$, and $a^5$ may be selectively meshed with the gears $a^2$, $a^4$, and $a^6$ respectively of the gear unit 11. The three speeds of shaft $b$ are again multiplied by the change gear mechanism B which comprises gears $b^1$ and $b^2$, and $b^3$ and $b^4$ of the units 12 and 13 respectively. Thus the selective positioning of the sliding units 13 and 10 by the hand lever 31 imparts six different speeds to the shaft $c$. The various speeds of shaft $c$ are again divided by the two-gear gear units 14 and 15 of the speed change set C, the unit 14 being adapted to be shifted by lever 32 so as to engage gears $c^1$ and $c^2$ or the gears $c^3$ and $c^4$, thereby providing twelve speeds to the shaft $d$. A second back gear speed change set D, actuated by the back gear lever 32, provides two additional changes in the speeds, making a total of twenty-four speeds to the spindle shaft 7. Thus, a clutch gear unit 17 keyed to shaft 7 is adapted to be moved downwardly so as to connect the drive through gears $d^1$ and $d^2$ with the spindle shaft, as by means of clutch teeth $17^a$ engaging clutch teeth $17^b$ formed in the loosely mounted gear unit 16, or moved upwardly so as to engage gears $c^2$ and $c^3$.

The foregoing briefly describes the spindle rotating train of gears, the transmission mechanism for feeding the spindle axially at various rates is taken preferably from the spindle and will now be explained.

The spindle shaft 7 also carries splined thereto a feed gear 18 which is constantly in mesh with a gear 19 forming a part of the anti-overload device mounted upon the feed shaft $f$ at the power input end of the feed train. The driving element 19 transmits the power to the shaft $f$ and thence through feed change gear mechanisms E, F and G to a feed worm shaft $h$. The first change gear set E provides three feed changes, to wit, by meshing gears $e^1$, $e^3$ or $e^5$, of gear unit 20 with the gears $e^2$, $e^4$, or $e^6$ respectively provided by the units 21 and 22 mounted upon a second shaft $g$. The second feed change mechanism also provides three speed changes as follows: The gear unit 23 is adapted to be moved axially upon the splined hub of a clutch gear $g^1$ so as to engage selectively gears $f^1$ and $f^2$, $e^6$ and $f^3$, or $f^4$ and $f^5$, making thus far a total of nine speeds to the hub portion of gear $g^1$. The nine speeds are again divided by the feed change gear mechanism G which comprises the clutch gear unit 24 and the loosely mounted gear unit 25. When the clutch element is moved "up" the gear $g^1$ engages the internal clutch teeth formed in the gear unit 24 and any one of the nine speeds of the gear $g^1$ is transmitted through the clutch element 24 to the feed shift $h$, but if the clutch element is moved "down" the drive is then through gears $g_1$, $g_2$, $g_3$ and $g_4$ to the feed shaft. Thus, eighteen feed rates are transmitted to the shaft $h$, and thence through worm 26, worm wheel 27, pinion shaft 28, gear and rack connection 29 and 30 to the translatable spindle sleeve $7^a$. A control lever 33 having nine positions controls the positioning of the finer feed change gear sets E and F, and control lever 34 controls the shifting of the back gear or coarse feed change gear set G. As illustrated by Figs. 1, 2 and 3 all of the control levers are located within convenient reach of the operator.

The foregoing description illustrates in a general way a multi-speed and feed transmission mechanisms of a drilling machine, the various elements of which, under ordinary conditions of operation are capable of withstanding heavy loads. However, if a safety means is not provided for rendering one of the gear trains inoperative or ineffective in the event that there is an overloading of the parts or that the force employed tends to exceed the maximum for which the machine was designed, the excessive stresses effect a straining of the parts and possibly a fracturing of the gears. Therefore, to insure against damage to the machine and to prevent undue working stresses therein, this invention proposes to provide a safety device adapted to be inserted as a unit in the feed train for interrupting the drive wherever the work load exceeds a predetermined maximum.

Ordinarily the larger tools are rotated at relatively slow rates of speed but are usually given a coarse feed. The feed train in this disclosure is so arranged that the feeding urge at spindle nose during coarse feeds is less than that delivered during the finer feeds, the result is that a unit increase in work resistance produces greater stresses upon the initial gears of the feed works than will a unit increase in the work resistance when using finer feeds.

Under normal conditions of operation the maximum feed that can be applied to the smaller sizes of drills is not sufficient to harm the feed works because the smaller dimensioned tools are the weaker of the two. Trouble is experienced, however, when using large tools under heavy loads, for under these conditions the feeding power required to overcome the work resistance may exceed the capacity of the elements of the feed train and the parts thereof are liable to break before the breaking point of the tool is reached.

It is proposed, therefore, to place a safety coupling in that portion of the feed train which is subjected to the heaviest loads, and to adjust the device so that it will suspend the drive when the feeding forces employed exceed a predetermined value.

For efficient operation a safety coupling of the multi-disc type indicated generally as S, see particularly Figs. 4, 5 and 6, is preferably placed at the input end of the feed train and when so positioned, it will be observed, is caused to run at relatively constant rate and that all of the changes in feed rate are made after the power is transmitted by the clutch. Inasmuch as the power transmitted by the clutch depends upon the speed at which it is driven, the greater the speed the greater is the power transmitted, and conversely, it will therefore be seen that if a given clutch is run at a relatively constant speed its efficiency remains constant irrespective of the possible changes which may be later effected in the ultimate output speed or force.

The safety device S is constructed and adjusted to carry the heaviest normal load, within the capacity of a given machine, and comprises, essentially, a base plate member 35 having gear teeth 19 cut on the periphery thereof, and which is loosely mounted upon the feed shaft $f$. A driven element 36 is splined to the shaft $f$ and held against axial movement thereupon by means of a lock nut 37. Movement of the driving member 35 is transmitted to the driven member 36 through a plurality of overlapping discs $j$ and $k$, the discs $j$ having projections $j^1$ which engage abutments 35$^a$ carried by the driving member; and the discs $k$ having abutments $k^1$ which engage abutments 36$^a$ of the driven member. Resilient means, such as springs 38 normally tend to maintain the discs in driving relation and exert a force substantially equal over the entire surface of the discs.

A cover plate 39 which provides recesses 40 for the seating and holding of the springs 38 in spaced relation, provides a means for sealing the unit against dirt, dust, etc., and also provides a means for effectively preventing unwarranted or easy adjustments thereof. Screws 41, accessible only from the underside of the base plate 35, hold the cover plate securely in place. Thus, the unit cannot be adjusted without first removing it from the machine and which, obviously, will not be attempted by the average operator without him first consulting his superiors.

Once the unit S is removed from its normal position in the train, the frictional resistance between the discs is easily varied. For example, the placing of shims between the engaging faces of the cover and base plates 39 and 35, will tend to decrease the value of the torsional stress permissible before the drive therethrough is interrupted. The converse is true if the shims are placed between the discs $j$ and the base plate 35, for under this condition the friction between the plates $j$ and $k$ will be increased and hence the value of the permissible load increased. Similarly, variations in the permissible load to be carried may be made by varying the number or size of friction discs employed and/or by the substitution of springs of different values.

It will be noted that the drive to the safety unit and feed works is taken directly from the spindle and with such an arrangement, the heaviest loads on the mechanism occur during the slower rotating speeds of the spindle. As the power capable of being transmitted by the clutch is less when driven at low speeds than when driven at high speeds, the drive through the feed train is readily interrupted when the load at the spindle nose increases beyond a predetermined maximum.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims.

Having thus revealed this invention, it is claimed as new and desired to secure the following combinations and elements, or equivalents thereof, by Letters Patent of United States:—

1. A radial drill having a translatable tool head and a rotatable and translatable spindle journaled therein, a multi-speed power transmission for rotating said spindle, combining a feed transmission comprising a plurality of change gear mechanisms in series for imparting translatory movements to said spindle at various preselected rates, said feed transmission being arranged to be driven by and directly from said spindle; and a safety device located in the input end of said feed transmission normally effective to maintain said feed transmission operative and adapted to interrupt the drive therethrough whenever the resistance to translatory movement of the spindle exceeds a predetermined value, said safety device including a plurality of superimposed friction discs operatively connected with the initial power transmission elements of said feed transmission; and a single means for initially adjusting the power transmitting value of said safety device and for sealing said device to prevent adjustment thereof during normal conditions of usage.

2. A drilling machine combining a tool head; a spindle rotatably and translatably journaled in said tool head; a prime mover; a multispeed driving transmission for rotating said spindle from said prime mover, said transmission including a plurality of sets of serially arranged speed change gears located in said head; a multispeed spindle feed transmission receiving motion from said spindle and subject to the variations of speed thereof, said spindle feeding transmission including a plurality of sets of serially arranged feed change gears; means for selectively meshing said feed change gears to produce any one of a plurality of ratios of spindle feed to spindle rotation; and means embodied in the initial end of said spindle feed transmission for limiting, to a predetermined value, the torque adapted to be transmitted to said spindle feeding transmission by said spindle, said means including a slip coupling located between said spindle and the initial one of said feed change gear sets, said coupling being adapted to slip when the resistance on said feed train reaches a predetermined maximum value, whereby the feed train is protected against overload while using high speed feed ratios.

3. A drilling machine combining a tool head; a spindle rotatably and translatably journaled in said tool head; a prime mover; a multi-speed driving transmission for rotating said spindle from said prime mover, said transmission including a plurality of sets of serially arranged speed change gears located in said head; a spindle feed driving gear on said spindle; a multi-speed spindle feed transmission receiving motion from the drive-gear on said spindle and subject to the variations of speed thereof, said spindle feeding transmission including a plurality of feed drive shafts located in said head and a plurality of sets of serially arranged feed change gears mounted on said shafts; means for selectively meshing said feed change gears to produce any one of a plurality of feed rates in combination with each rate of spindle rotation; and means embodied in the initial end of said spindle feed transmission for limiting to a predetermined value, the torque adapted to be transmitted to said spindle feeding transmission by said spindle, said means including a slip coupling located between said feed drive gear and the initial one of said feed change gear sets said coupling being adapted to transmit to the feed transmission a predetermined torque and then to slip, whereby the feed train is protected against overload while using high speed feed rates.

H. HENRY SUNDERMANN,
*Executor of the Last Will and Testament of David C. Klausmeyer, Deceased.*